US006085506A

United States Patent [19]

Fineblum

[11] Patent Number: 6,085,506

[45] Date of Patent: Jul. 11, 2000

[54] QUIET EXTERNAL COMBUSTION LAWN MOWER

[75] Inventor: Solomon S. Fineblum, Rochester, N.Y.

[73] Assignee: Megadyne Inc., Rochester, N.Y.

[21] Appl. No.: 08/053,175

[22] Filed: Jul. 8, 1993

[51] Int. Cl.[7] .......... A01D 34/76

[52] U.S. Cl. .......... 56/16.7; 56/17.5; 60/650

[58] Field of Search .......... 56/17.5, 16.7, 56/1; 60/650, 652, 683, 311

[56] References Cited

U.S. PATENT DOCUMENTS 3,893,300 7/1975 Connell .......... 60/683
4,224,798 9/1980 Brinkerhoff .......... 60/652
4,663,939 5/1987 Cosby .......... 60/650
5,177,962 1/1993 Hall et al. .......... 60/311

*Primary Examiner*—Terry Lee Melius

[57] ABSTRACT

A lawn mower is powered by a quiet external combustion engine which is based on an Ericcson cycle which has been modified for more efficient combustion and higher temperature from the regenerative heat exchanger. Air is compressed in a compressor, then regeneratively heated in a heat exchanger by combustion exhaust prior to being expanded in a heated expander to generate power. The heated expander is in intimate thermal contact with the combustion chamber wherein combustion is efficiently supported by hot expanded air from the heated expander. The lawn mower includes a starter and conventional means for control, support and locomation.

10 Claims, 9 Drawing Sheets

| INPUT | NORMAL BURNER | AUXILIARY BURNERS | OUTLET THROTTLE | DRIVE CLUTCH |
|---|---|---|---|---|
| CONTROL SETTING START | | | | |
| SPEED LESS THAN 90%<br>TEMPERATURE NOM + 29 °F | 1 | 1 | 1 | 0 |
| SPEED 90%<br>TEMPERATURE >NOM + 30 °F | 1 | 0 | 1 | 0 |
| SPEED > 100%<br>TEMPERATURE > NOM + 50 °F | 1 | 0 | 1 | 1 |
| CONTROL SETTING: NORMAL | | | | |
| SPEED LESS THAN 90%<br>TEMPERATURE NOM + 40 °F | 1 | 0 | 1 | 0 |
| TEMPERATURE > NOM + 50 °F | 0 | 0 | 1 | 0 |
| SPEED > 90% | 1 | 0 | 1 | 1 |
| CONTROL SETTING: IDLE | | | | |
| SPEED 40%<br>TEMPERATURE NOM + 40 °F | 1 | 0 | 0.75 | 0 |
| SPEED HALF +/- 10%<br>TEMPERATURE NOM + 40 °F | 1 | 0 | 0.50 | 0 |
| SPEED > 60%<br>TEMPERATURE NOM + 40 °F | 1 | 0 | 0.4 | 0 |
| CONTROL SETTING : OFF | 0 | 0 | 0 | 0 |

FIG. 12A

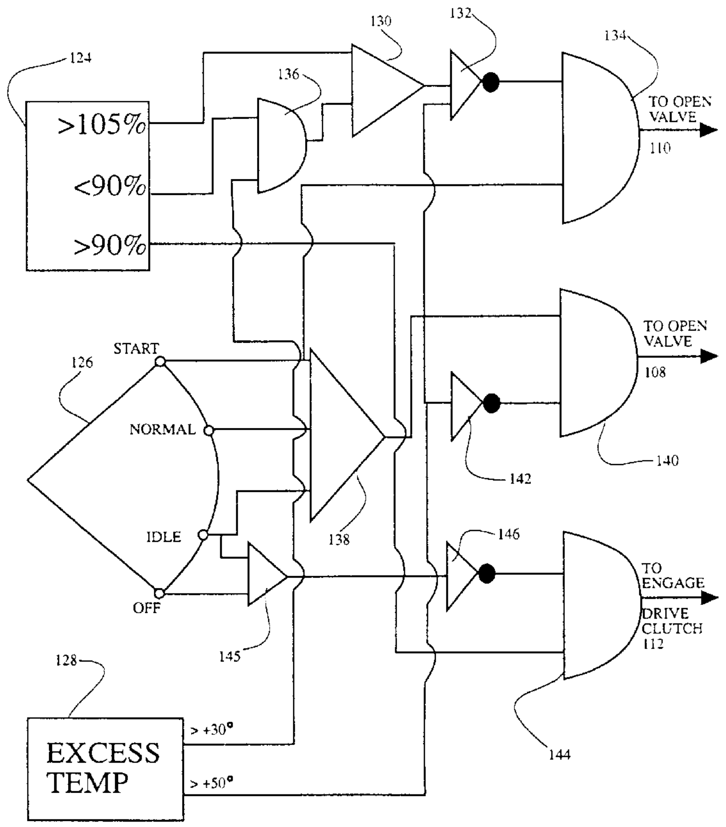

12 B

QUIET EXTERNAL COMBUSTION LAWN MOWER

BACKGROUND

1. Field of Invention

This invention relates to powered lawn mowers and external combustion powered lawn mowers in particular.

2. Description of Prior Art

Presently available engine powered lawn mowers are driven by internal combustion engines which are noisy, inefficient and highly polluting. Electrically driven lawn mowers are awkward to use and dangerous. Available external combustion engines are typically very slow starting because of both thermal and rotational inertia.

J. A. Connell U.S. Pat. No. (3,893,300) approximates a standard Brayton cycle with compression, constant pressure heating, and approximately isentropic expansion through a power producing expansion turbine. There is a thermal capacitance to help energize the turbine in response to rapid increases in the load. In contrast to our invention, Connell has adiabatic rather than isothermal or near isothermal expansion in a directly heated expander, as we teach, and lacks a supply of preheated air into the combustion chamber. There is no anticipation nor obviousness in Connell because of strong thermodynamic, functional and structural distinctions.

Van Don C. Brinkerhoff U.S. Pat. No. (4,224,798) teaches an engine driven compressor which is refrigerant cooled with an air motor. Compressed, but not heated, air is supplied to the internal combustion engine. There is no directly heated expansion, no regenerative heat exchanger and no preheated combustion air. Our invention is, therefore, both distinct and superior.

T. L. Cosby U.S. Pat. No. (4,663,939) teaches a modified Rankine cycle with superheating while our quiet lawn mower engine is a modified, open cycle Ericcson cycle. Cosby also lacks regenerative heat exchange and heated expansion. From the point of utility it can be shown that concurrent compression and cooling is not especially efficient. The First Law predicts that the work energy available for compression is depleted by simultaneous cooling. Secondly, electrolysis adds additional parasitic losses to the system. Thermodynamically, functionally and structurally our invention is clearly distinct from Cosby.

OBJECTS AND ADVANTAGES

Accordingly, several objects and advantages of the present invention are:

a. to provide a lawn mower that is driven by a quiet external combustion engine;
b. to provide an engine driven lawn mower that is less polluting than internal combustion driven lawn mowers;
c. to provide an engine driven lawn mower that is more fuel efficient than internal combustion engine driven lawn mowers.
d. to provide for efficient recovery of combustion chamber exhaust heat.
e. to provide for pre-heating combustion air with more efficient combustion.
f. to provide for a heated expander with reduced thermal inertia with more rapid starting.
g. to provide for reduced rotational inertia in compressor and expander with more rapid starting.

DESCRIPTION OF INVENTION

Figure 1:
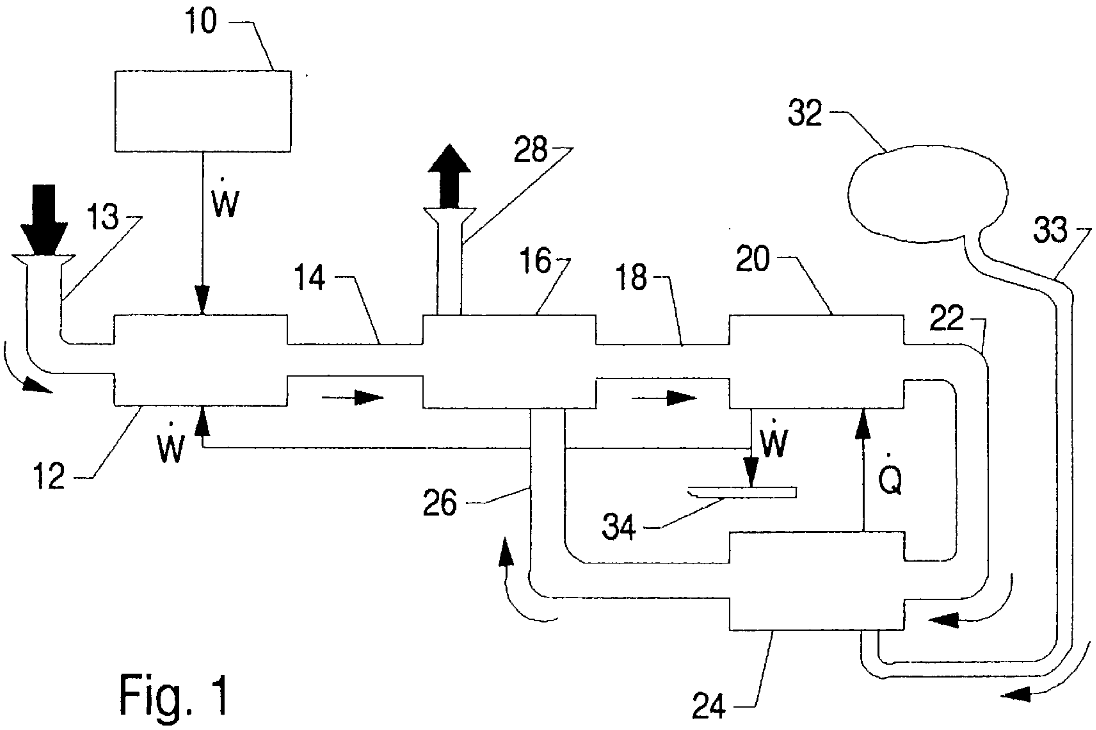
FIG. 1 is an energy and fluid flow schematic of quiet lawn mower.

FIG. 1 is an energy and fluid flow schematic of a quiet lawn mower power system. W and Q adjacent to the single width lines represent work and heat transfer, respectively. During start-up a starter 10 drives a compressor 12. During normal operation, a heated expander 20 drives both the compressor 12 and cutting blade assembly 35 with blades 34. During operation, air enters through a compressor inlet 13 into compressor 12 wherein it is driven through a compressor outlet air duct 14 into a regenerative heat exchanger 16. Preheated compressed air flows through a regenerative heat exchanger outlet air duct 18 into expander 20 wherein preheated compressed air is expanded. Expansion within heated expander 20 continues while the air is heated by heat from combustion chamber 24.

Combustion chamber 24 is in intimate thermal contact with heated expander 20. The expansion of heated compressed air within expander 20 acts to generate power therein. This is the power needed to drive cutter blade assembly 35 and blades 34.

Hot expanded air flows from expander 20 through an expander outlet air duct 22 into combustion chamber 24. Fuel from a fuel tank 32 flows through a fuel line 33 into combustion chamber 24 where combustion of the fuel is supported by hot expanded air flowing in through expander outlet air duct 22.

Combustion is initiated and sustained, if necessary, by ignitors, not shown, which are internal to combustion chamber 24. After giving up heat to expander 20, the still hot combustion gasses from combustion chamber 24 through a combustion chamber gas outlet duct 26 into the hot side of regenerative heat exchanger 16. Therein heat is transferred from combustion gasses to the cooler compressed air from compressor 12 such that the compressed air is preheated as desired. The combustion gasses then flow from regenerative heat exchanger 16 through an exhaust vent 28 into the ambient.

Figure 2:
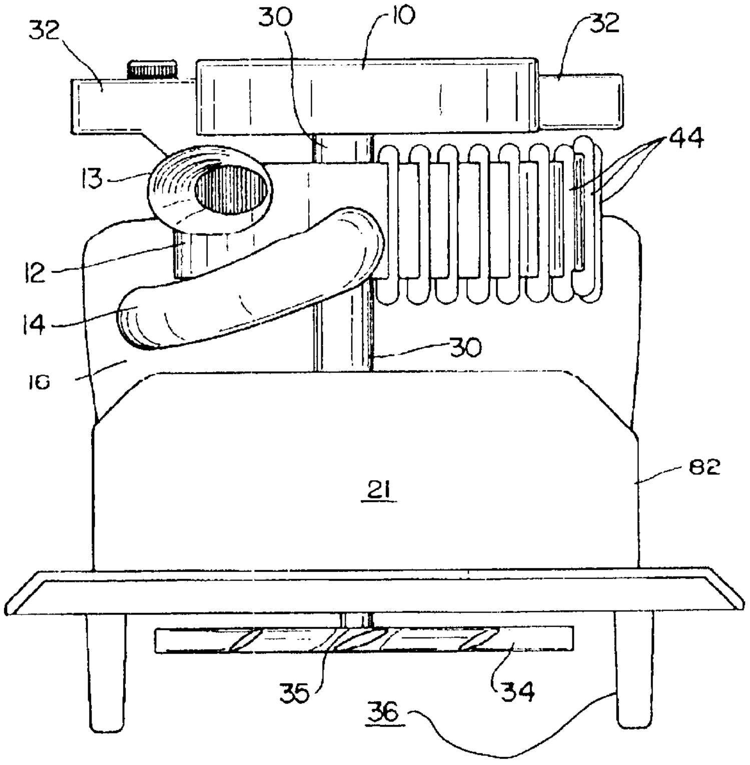
FIG. 2 is a general elevation of one embodiment.

FIG. 2 is a general elevation of one embodiment of a lawn mower powered by the quiet external combustion engine. The starter 10 drives compressor 12 and heated expander 20 which is within an expander-combustion chamber assembly 21 until the compressed air within expander 20 is sufficiently heated. Fuel is supplied to combustion chamber 24 within expander-combustion chamber assembly 21 from fuel tank 32 through fuel line 33, not shown. Once sufficiently heated, the air expanding within heated expander 20 will provide the torque to drive both compressor 12 and cutter blade assembly 35 and blades 34. Clutches, not shown, will disengage from starter 10 and engage cutter blade assembly 35 and blades 34 when system operational rotational speed has been attained. Air enters compressor 12 through compressor inlet 13 and is compressed. The compressed air flows through compressor outlet air duct into regenerative heat exchanger 16 wherein it is heated by combustion gasses from combustion chamber 24 within expander-combustion chamber assembly 21. The preheated air flows into heated expander through heat exchanger outlet air duct, not shown. The lawn mower power system is mounted on the lawn mower frame, not detailed, and propelled on wheels 36. Lawn mower is similar to conventional lawn mowers except for the lawn mower engine which is a quiet external combustion engine.

Figure 3:
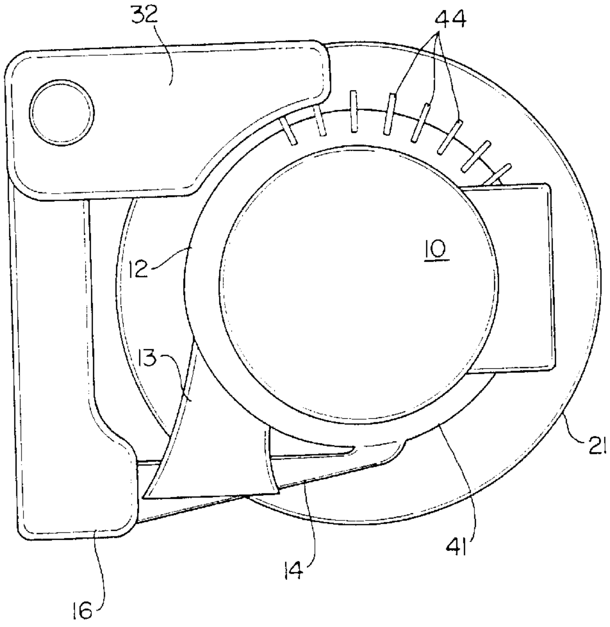
FIG. 3 is a plan view.

FIG. 3 is a plan view of one embodiment of a quiet, external combustion engine driven lawn mower. Air flows through compressor inlet 13 into compressor 12, is compressed there while being cooled somewhat and is then driven out through compressor outlet duct 14 into regenerative heat exchanger 16. Fins 44 augment heat transfer from compressor 12. Lawn mower is similar to conventional lawn mowers except for the lawn mower engine which is a quiet external combustion engine.

Figure 4:
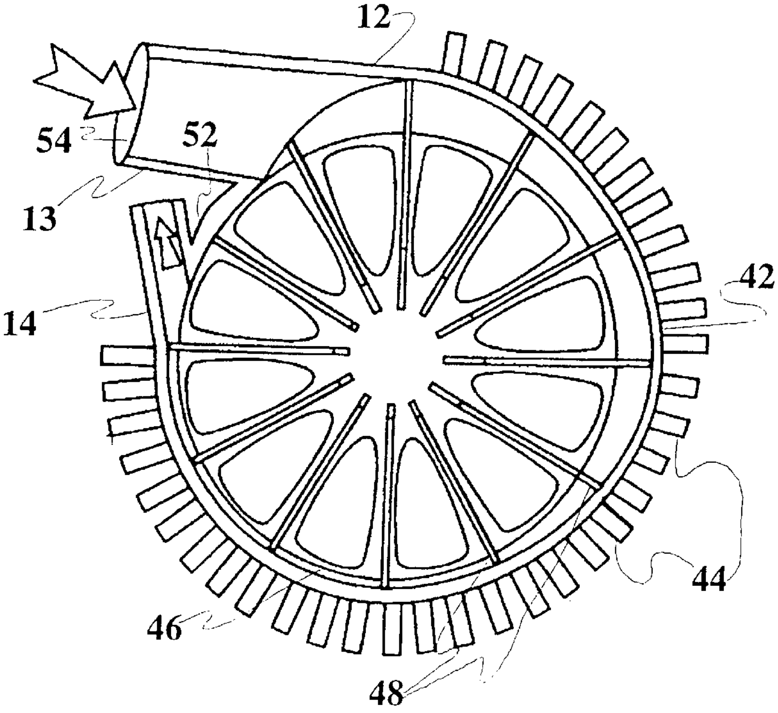
FIG. 4 is a cross-sectional view of one embodiment of a compressor.

FIG. 4 is a cross-sectional view of an embodiment of compressor 12 which comprises a compressor enclosure 42, a slotted rotor 46, a plurality of vanes 48 which slide freely within the slots of slotted rotor 46, a compressor inlet, a compressor outlet air duct, and a drive shaft, not shown. Compressor enclosure 42 is formed with a decreasing distance between the wall of enclosure 42 and slotted rotor 46. Air enters compressor 12 through compressor inlet 13. As typical with vane compressors, air is compressed as the volume trapped between vanes 48 decreases while they move forward and are forced further into slots of slotted rotor 46. Compressed air is driven from compressor 12 through compressor outlet air duct 14. Compressor enclosure 42 fits closely around slotted rotor 46 to form an interpressure seal 52 between the low pressure at the inlet and high pressure at the outlet of compressor 12. Slotted rotor 46 is hollow in order to reduce the rotational inertia during starting. Fins 44 act to augment cooling of compressor 12.

Figure 5:
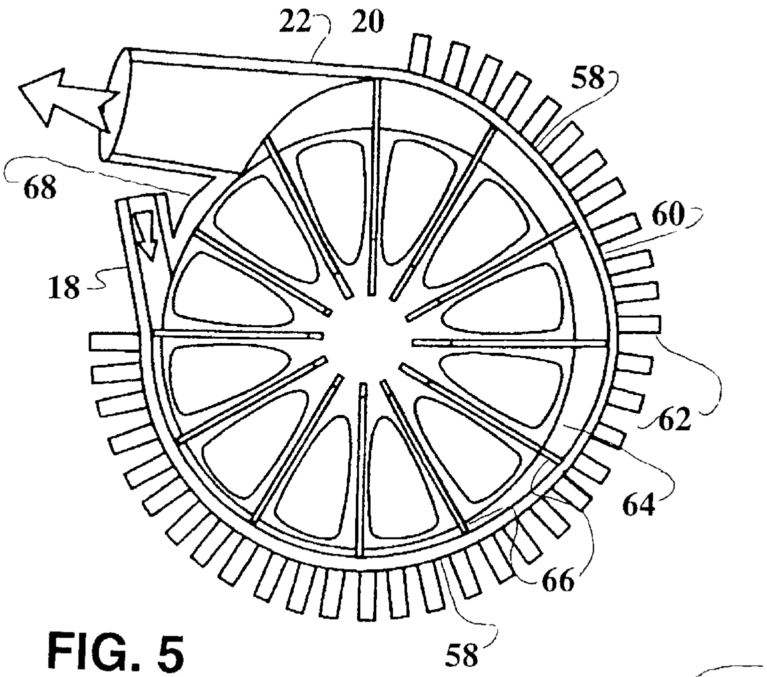
FIG. 5 is a cross-sectional view of an expander.

FIG. 5 is a cross-sectional view of one embodiment of heated expander 20. Heated expander 20 is similar to conventional vane air motors except that air within heated expander 20 is heated during expansion. Expander 20 comprises an enclosure 60, fins 62, a slotted rotor 64, vanes 66, an interpressure seal 68, regenerative heat exchanger outlet air duct 18 which acts as an inlet to expander, an expander outlet air duct 22 and a drive shaft 30, not shown. Expander enclosure 60 has an expanding wall from heated expander entrance toward the exit with an increase in radial distance between the wall of enclosure 60 and slotted rotor 64. As a result, vanes 66 are radially extended so that the volume of air trapped between them are thus expanded. This expansion produces a torque against vanes 66 which is transmitted to slotted rotor 64 and drive shaft 30, not shown. The thermodynamic efficiency of expansion is greatly increased by the simultaneous heating and expansion which occurs within expander 20. Slotted rotor 64 is hollow in order to reduce the mass, rotational inertia and thermal inertia. As a result, the start cycle will be shortened. Fins 62 act to augment heat transfer through expander enclosure 60 into heated expander 58. Heated expander 58 is installed in intimate thermal contact with combustion chamber 24.

Figure 6:
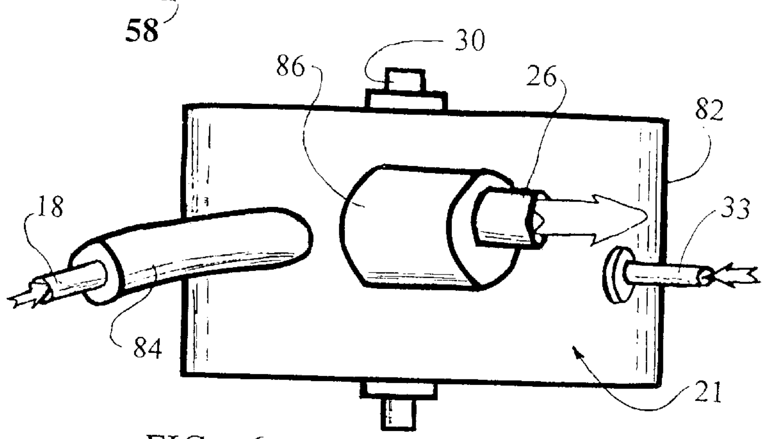
FIG. 6 is a cross-sectional view of one embodiment of the expander-combustion chamber assembly.

FIG. 6 is a cross-sectional view of an embodiment of the expander-combustion chamber assembly 21 which contains heated expander 20 enclosed within combustion chamber 24. The air within heated expander 58 endothermally expands to drive shaft 30 and then flows out through expander outlet air duct 22 into air distribution plenum 72. Air distribution plenum 72 is perforated to uniformly distribute air into combustion chamber 24. Fuel line 33 directs fuel into combustion chamber 24 wherein the fuel is distributed by a fuel distribution plenum 74 which contains many small perforations (<1 mm) which act as fuel nozzles. The sprayed fuel is ignited by ignitors 76. The resulting combustion gasses flow down to impinge upon and heat the outer surfaces of expander enclosure 60 and then out through assembly outlet 78. Fins 62 augment heat transfer into heated expander 58. Insulation 82 around assembly 21 acts to conserve the heat generated therein. Shaft shield 80 protects shield 30 from combustion gasses.

Figure 6A:
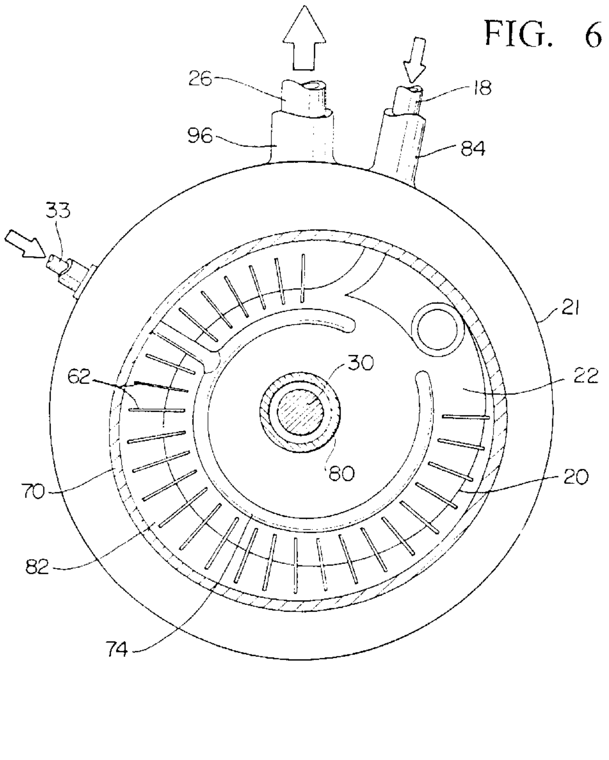
FIG. 6A is an cross-sectional plan view of the expander-combustion chamber assembly.

FIG. 6A is a cross-sectional plan view of expander-combustion chamber assembly 21. Regenerative heat exchanger outlet duct 18 directs preheated and compressed air into expander 20 wherein it is heated while being endothermally expanded to produce the torque to drive shaft 30. Fuel line 33 and fuel distribution plenum 74 provide the fuel while ignition is provided by ignitors 76, not shown. Enclosure 70 confines the combustion gasses to flow close to fins 62 which augment heat transfer. Duct insulation 96 minimizes heat loss from ducts to and from regenerative heat exchanger 16.

Figure 7:
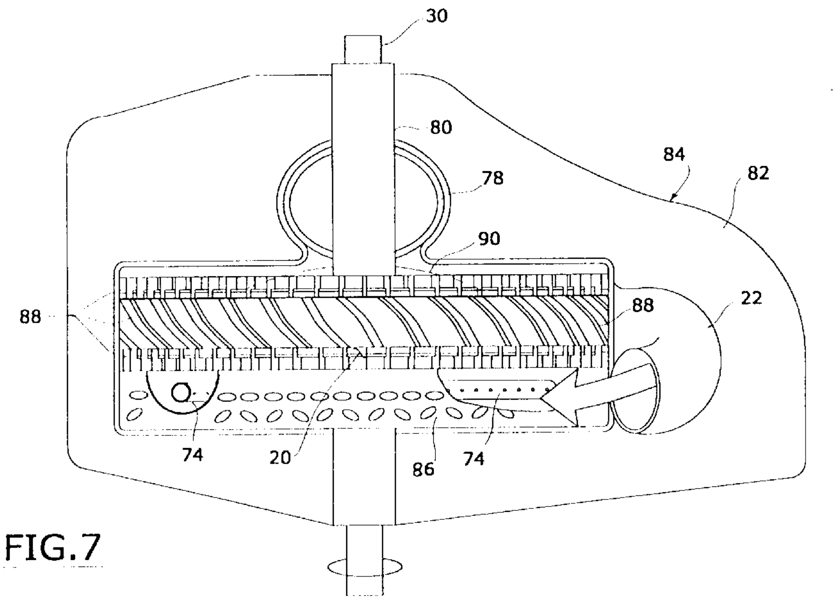
FIG. 7 is a cross-sectional view of another embodiment of the expander-combustion chamber assembly.

FIG. 7 is a cross-sectional view of another embodiment of an expander-combustion chamber assembly 84. Expanded air leaves heated expander 20 through expander outlet air duct 22 and flows into combustion air manifold 86 which is formed by a manifold-combustion chamber separator plate 92. Perforations in separator plate 92 releases air in diverse directions to stimulate turbulence within combustion chamber 24 which stimulates heat transfer between combustion gasses and expander enclosure 60 of expander 20. Fuel is distributed throughout combustion chamber 24 by fuel distribution plenum 74. Fuel line 33 and ignitors 86 are not visible. The angular placement of deflector fins 88 also stimulate heat transfer into expander 20 by increasing the path length of the hot combustion gasses along expander enclosure 60 and by further stimulating turbulence. The combustion gasses leave alternate expander-combustion chamber assembly 84 through assembly outlet 78 toward regenerative heat exchanger 16, not shown. Insulation 82 conserves heat generated within alternate expander-combustion chamber assembly 84. Drive shaft 30 is driven by expander 20 and protected by drive shaft shield 80.

Figure 7B:
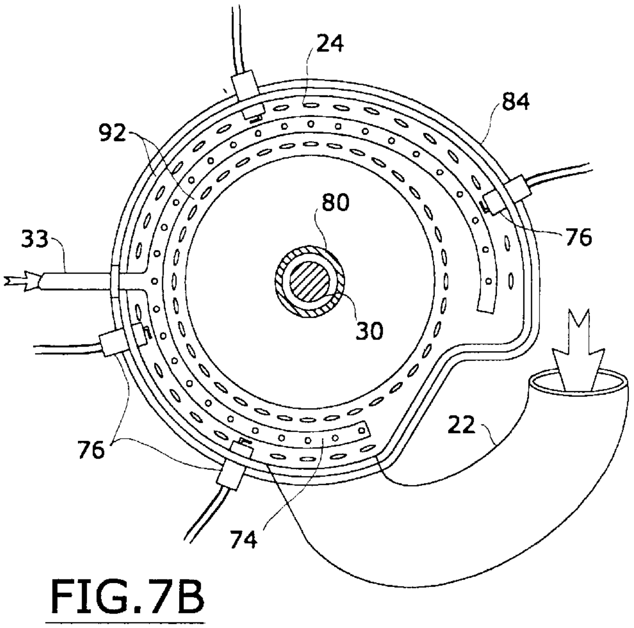
FIG. 7B is a plan view of the combustion air manifold.

FIG. 7A is a plan view of heated expander 20 within alternate expander-combustion chamber assembly 84. Compressed preheated air enters heated expander 20 through regenerative heat exchanger outlet 18 and is heated by heat from combustion gasses during endothermic expansion to generate the torque to drive drive shaft 30. Expander-combustion chamber enclosure 70 is formed close to the outer edges of deflector fins 88 to confine flowing combustion gasses to immediate vicinity of deflector fins 88 and outer surface of expander enclosure 60. Deflector fins 88 which are installed at an angle to expander enclosure 60 increase turbulence and increase path length of hot gas flow along outer surface of expander 20. These effects stimulate heat transfer. The expanded gas leaves expander 20 through expander outlet air duct 22 and enters combustion gas manifold 86, not shown in this view, to support combustion at a relatively high initial temperature. Insulation 82 is omitted in this view. A top deflector 90 deflects combustion gasses away from the central portion of expander 20 containing slotted rotor 64 and toward outlet of combustion chamber 24. FIG. 7B is a plan view of combustion side of manifold separator plate 92 of combustion air manifold 86 and the lower portion of combustion chamber 24 of alternate expander-combustion chamber assembly 84. Fuel supply line 33 directs fuel into perforated fuel distribution manifold 74 which distributes fuel throughout combustion chamber 24. Air is supplied by expander outlet 22 into combustion air manifold 86 which distributes air throughout combustion chamber 24. Ignitors 76 assure ignition of resulting combustible fuel-air mixture within combustion chamber 24. Drive shaft shield 80 protects drive shaft 30.

Figure 7C:
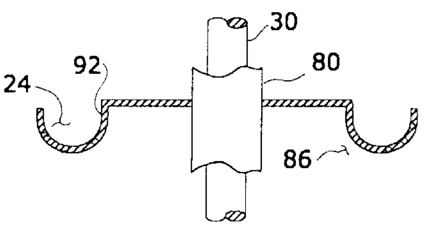
FIG. 7C shows a cross-section of the combustion air manifold

FIG. 7C shows a cross section of manifold separator plate 92 which separates combustion air manifold 86 from combustion chamber 24.

Figure 8:
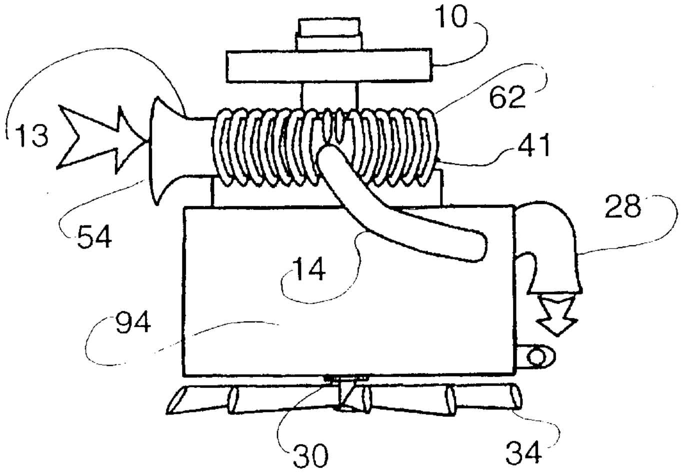
FIG. 8 shows an elevation of another embodiment of lawn mower with an enclosed hot system.

FIG. 8 shows an elevation of another embodiment of a lawn mower with an enclosed hot system. The starter 10 drives a cooled compressor 41 after fuel is directed into combustion chamber 24 within a hot system assembly 94 and the ignitors are energized. Starter 10 is deactivated when the compressed air within heated expander 20 is sufficiently heated to generate sufficient torque to drive cooled compressor 41 at operational speed. Fuel is supplied to combustion chamber 24 within hot system assembly 84 from fuel tank 32 through fuel line 33, shown elsewhere. Once sufficiently heated, the air expanding within expander 20 will provide the torque to drive blades 34 as well as compressor 41 and blades 34. Clutches, not shown, will disengage from starter 10 and engage blades 34 when system operational rotational speed has been attained. Air enters cooled compressor 41 through compressor inlet 13 and is compressed. The compressed air flows through compressor outlet air duct into regenerative heat exchanger 16 which is included within hot system assembly wherein it is heated by combustion gasses from expander-combustion chamber assembly 21. The preheated air flows into expander 20 through regenerative heat exchanger outlet air not shown. The lawn mower power system is mounted on the lawn mower frame, not detailed, and propelled on wheels 36.

Figure 9:
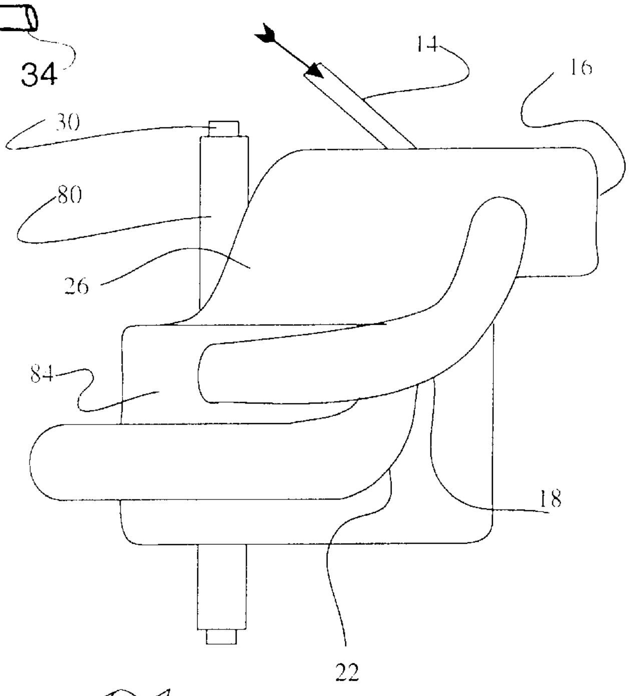
FIGS. 9 and 9A show the hot system assembly.
Figure 9A:
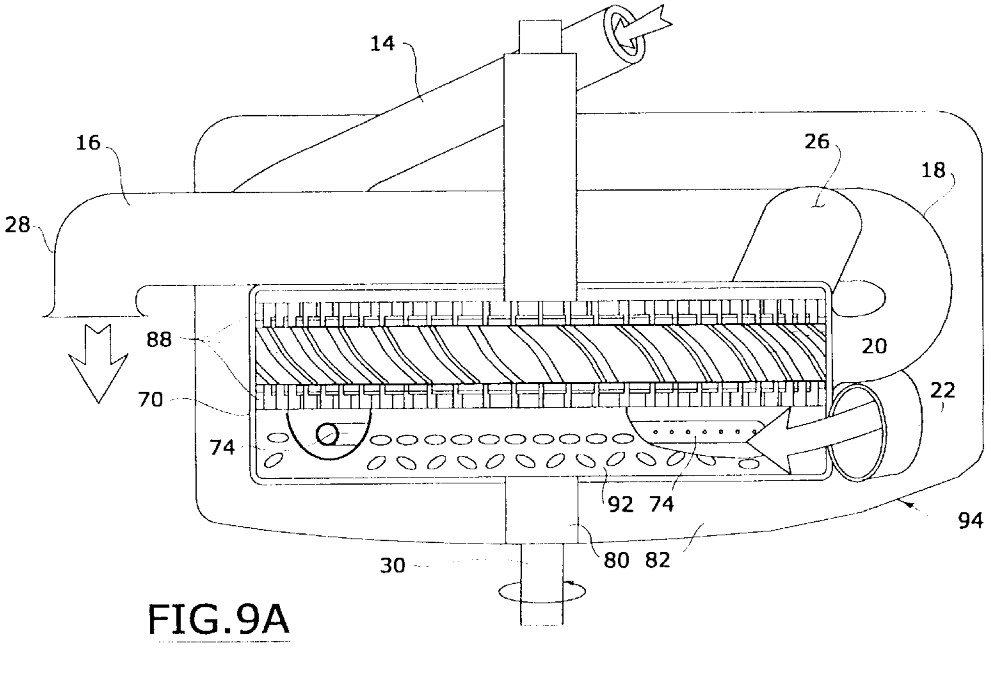

FIG. 9 shows the exterior of hot system assembly 94 which consists of regenerative heat exchanger 16 and alternate expander-combustion chamber assembly 84 assembled into one insulated unit. FIG. 9A shows an interior side view of hot system assembly 94. Compressor outlet air duct 14 directs compressed air into cool path within regenerative heat exchanger 16 wherein it flows in intimate thermal contact with hot combustion gasses flowing within the hot passages within regenerative heat exchanger 16. Compressed preheated air enters heated expander 20 through regenerative heat exchanger outlet 18 and is heated by heat from combustion gasses during endothermic expansion to generate the torque to drive drive shaft 30.

Expander-combustion chamber enclosure 70 is formed close to the outer edges of deflector fins 88 to confine flowing combustion gasses to immediate vicinity of deflector fins 88 and outer surface of expander enclosure 60. Deflector fins 88 which are installed at an angle to heated expander enclosure 60 increase turbulence and increase path length of hot gas flow along outer surface of expander 20 to stimulate heat transfer. Hot gas leaves expander 20 through expander outlet air duct 22 to reenter alternate expander-combustion chamber and enters combustion gas manifold 86, not shown in this view, to support combustion at a relatively high initial temperature. Insulation 82 surrounds the heated and hot components of assembly 94. Hot exhaust gasses flow through hot passages of regenerative heat exchanger 16 to preheat compressed air flowing in the cooler passages and out through exhaust vent 22.

FIG. 10 shows various methods of compressor cooling.

Figure 10A:
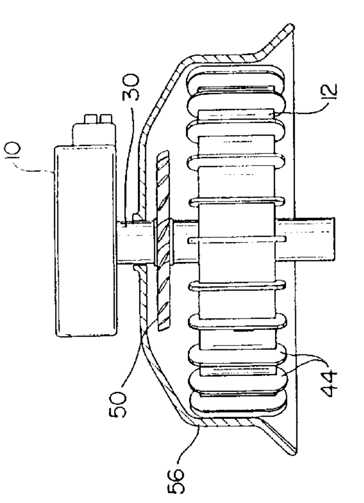
FIGS. 10A and 10B show of various methods of compressor cooling.

FIG. 10A shows one method of air cooling compressor 12. The clear space above and below compressor 12 permits greater air circulation. Compressor fan 50 is mounted on drive shaft 30 and blows air directly upon compressor 12 and past fins 44 to stimulate heat transfer from compressor 12. A fan housing 56 restrains fan stimulated airflow to remain close to fins 44 and the compressor enclosure 42 for improved compressor cooling.

Figure 10B:
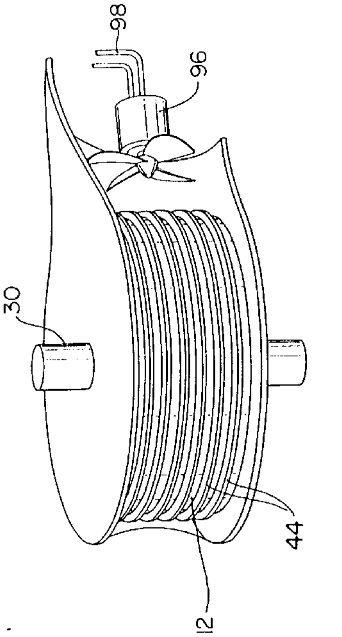

FIG. 10B shows another configuration of for cooling of compressor 12. Fan assembly 31 receives electrical energy through fan assembly wiring 98. Air is blown by fan assembly 96 pass compressor 12 and compressor fins 44 to simulate heat transfer from compressor 12 to lower compressor temperature and thereby improve compressor efficiency. Fan airflow enclosure 58 restrains air flow to remain close to compressor fins 44 and compressor enclosure 42 of compressor 12 to more effectively cool compressor 12. One face of fan enclosure 58* is omitted for better visibility.

Figure 11A:
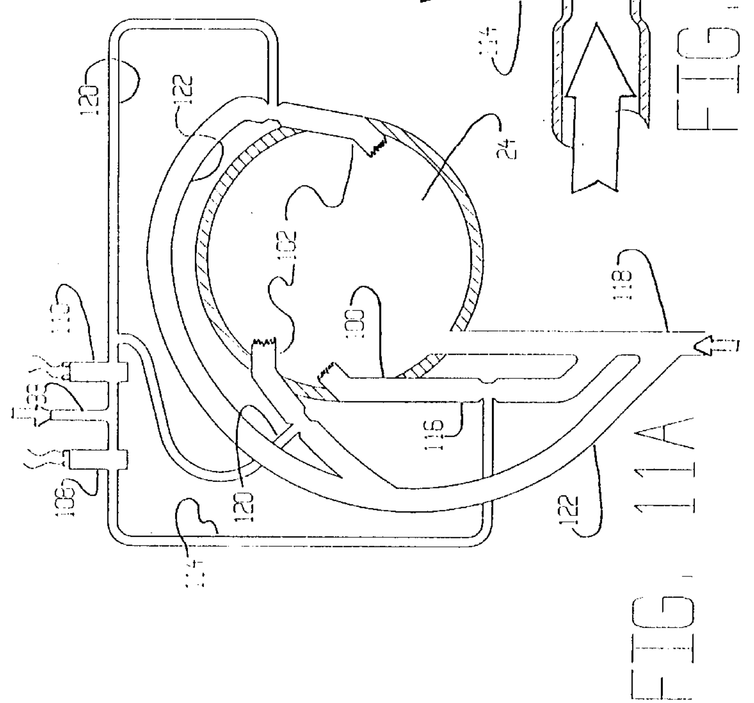
FIGS. 11A and 11B show bilevel burner system
Figure 11B:
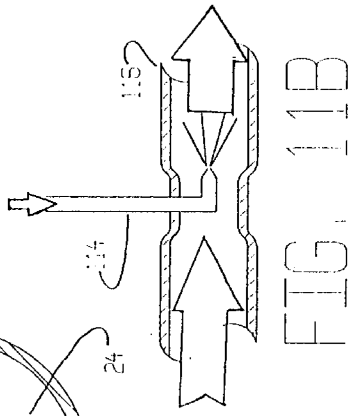

FIGS. 11A and 11B show details of an arrangement of burners 100 and 102 and related components. Fuel supply valve 108 and auxiliary fuel supply valve 110 control fuel flow from fuel line 33 to fuel supply line 114 and auxiliary fuel supply line 120. Combustion chamber 24 receives air to support combustion through air inlet manifold 118. Fuel supply line 114 delivers fuel into Venturi section of an air supply line 116, which branches off of inlet manifold 118, is formed into a Venturi section prior to reaching combustion chamber 24. Fuel enters the Venturi section of air inlet duct 116 through fuel supply line 114. Within the Venturi section of air supply line 116 the air pressure is reduced by Venturi effect and fuel is atomized in a fuel-rich mixture prior to entering burner 100.

Similarly, auxiliary burners 102 are supplied a fuel-rich mixture by the atomization of fuel from auxiliary fuel supply line 120 which enters auxiliary air supply manifold 122 at the two Venturi sections. The fuel percentage downstream of the Venturies are too rich, about 15%, to support combustion. Ignitors 76, not shown are close to burners 100 and 102 to initiate and sustain combustion. The air flowing directly from air supply manifold 118 into combustion chamber 24 dilutes the overly rich fuel-air mixture entering burners 100 and 102 to a readily combustible mixture with excess air.

FIG. 12 show various portions of control system.

FIG. 12A shows a state truth table of normal burner 100, auxiliary burners 102, position of an exhaust throttle 104 and drive clutch 112 as a function of setting of control 106, rotational speed and temperature of expander outlet air. The of settings of control 106 are: Start, Normal operation, half power, Idle and OFF. As can be seen in FIG. 12A, normal burner 100 will be on at all times except when setting of control 106 is OFF or when heat exchanger inlet temperature is excessive (>50 oF above nominal).

Auxiliary burners will be on when control 106 is on Start, rotational speed is less than 100% of nominal speed and heat exchanger temperature is less than 30 oF above nominal. Exhaust throttle 104 is wide open if control 106 is set between Start and Normal. Throttle 104 closes as control 106 is moved from Normal toward Idle in an approximately proportional manner. At Idle the setting is controlled to approximately half speed and the drive clutch 112 is disengaged.

In general, 1 means "TRUE", "on", "open" or engaged; 0 means "FALSE", "OFF", closed or disengaged.

FIG. 12B shows a binary logic circuit of most of the control system comprising four two-input BOTH-AND logic elements, two two-input EITHER-OR logic elements, a three-input EITHER-OR logic element, three NOT logic elements, a speed detector 124, a main control 126 and a temperature detector 128. If speed greater than 105% of nominal is detected, speed detector 124 will transmit a signal to EITHER-OR logic element 130 which will activate NOT logic element 32 which acts to inhibit two-input BOTH-AND logic element 134 to therefore keep auxiliary solenoid valve 110 closed. If speed detector detects a speed below 90% of nominal at the same time when excessive temperature is detected by excess temperature detector 128 the combined signal will activate two-input BOTH-AND logic element 136 which will, in turn, activate two-input EITHER -OR logic element 130 and NOT logic element 132 to inhibit two-input BOTH-AND logic element 134 which will act to keep auxiliary solenoid valve 110 closed and auxiliary burners 102 inoperative. If main control 126 is at the START setting, and if there are no inhibiting speed or temperature signals, the START signal will activate BOTH-AND logic element 134 to open auxiliary solenoid valve 110 to supply fuel to auxiliary burners 102. Thus, auxiliary burners will be activated when control 126 is on START and there are no inhibiting temperature or speed conditions.

If control 126 is set at either the START, NORMAL or IDLE, EITHER-OR logic element 138 will transmit an enabling signal to BOTH-AND logic element 140 to open fuel solenoid valve 108 to supply fuel to burner 100. If, however, excessive temperature is detected anywhere in the heated portions of the system, a NOT logic element will act to deprive BOTH-AND logic element 140 of an enabling signal and fuel solenoid 108 will be kept closed to deprive burner 100 of fuel and combustion will be ended to prevent high temperature damage.

Whenever engine speed is greater than 90% of nominal as detected by speed detector 124, BOTH-AND logic element 144 is sent a positive signal. If, in addition, NOT logic element 146 receives no signal from either IDLE or OFF setting of control 126, BOTH-AND logic element 144 will be enabled and wheel drive clutch 148, will be engaged to drive lawn mower wheels 36. If, however, control 126 is set at either Idle or Off, EITHER -OR logic element 145 will send an inhibiting signal to NOT logic element 146, it will be inert, and BOTH-AND logic element 144 will be deprived of one of the required enabling signals. As a result, drive clutch 148 will not be actuated whenever the lawn mower engine is either in Idle or Off.

FIGS. 12C,12D,12E and 12F show TS and PV diagrams that represent thermodynamic processes during Start, and Normal operation. 12C and 12D represent Start. Step 1-2 represents polytropic compression rather than adiabatic because compressors are cooled. Process 2-3 is constant pressure regenerative heating of air by intimate thermal contact with hot combustion chamber exhaust gasses within regenerative heat exchanger 16. Process 3-4 represents approximately isothermal expansion within heated expander 20 which is in intimate thermal contact with hot combustion gasses. The hot expanded air leaves heated expander 20 and flows into combustion chamber 24 wherein it forms a relatively rich combustible fuel-air mixture and burns at constant pressure along line 4-5. The combustion inlet air is thus much warmer than ambient air.

Hot combustion gasses flow in intimate thermal contact with expanding air within expander 20 and are thus cooled as shown by line 5-6. After leaving thermal contact with expander 20 the still hot exhaust gasses flow into regenerative heat exchanger 16 to preheat compressed air 2-3 and be cooled along line 6-7 before being vented to the ambient. The heat required to approach isothermal rather than adiabatic expansion is represented by the area difference between the isothermal expansion line 3-4 and the adiabatic expansion line 3-4'. This additional heat is assured by increased combustion from auxiliary burners 102. Regeneratively heated air has been heated by thermal contact with hot combustion chamber exhaust gasses rather than relatively cool expander outlet air, air entering expander 20 is hotter than in traditional Ericsson cycle power systems. Further, combustion generates hotter gasses more efficiently than in conventional Ericsson power systems because combustion within combustion chamber 24 is supported by warm expander outlet air rather than relatively cool ambient air.

Figure 12C:
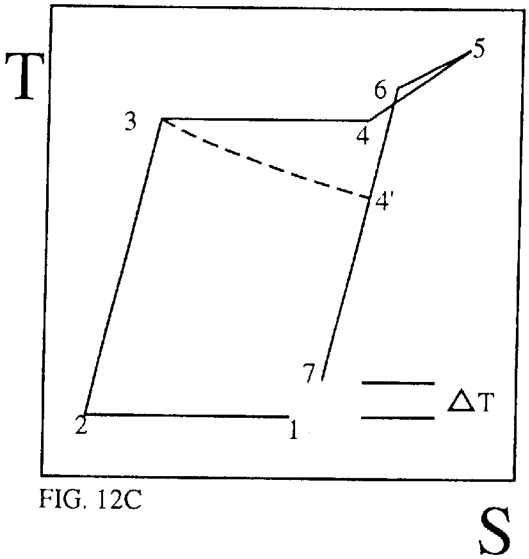
FIGS. 12A and 12B show various aspects of the starting and control system
Figure 12D:
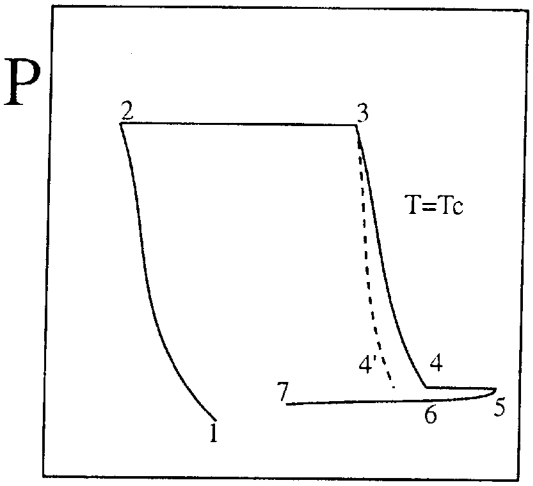

FIGS. 12C and 12D illustrate the thermodynamics of the start cycle. All the burners; normal 100 and auxiliary 102, are required to assure a relatively high temperature, approximately isothermal, expansion throughout heated expander 20. The higher temperature, increased specific volume and relatively flat P-V along 3-4 result in a relatively large area within the TS and PV diagrams. These conditions generate an increased power as required to accelerate the rotary components during Start.

Figure 12E:
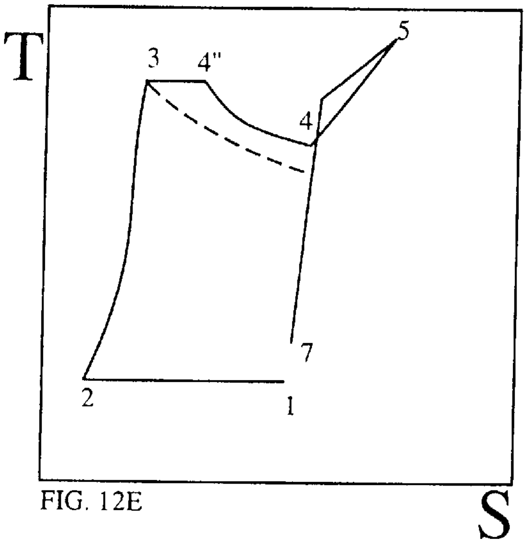
Figure 12F:
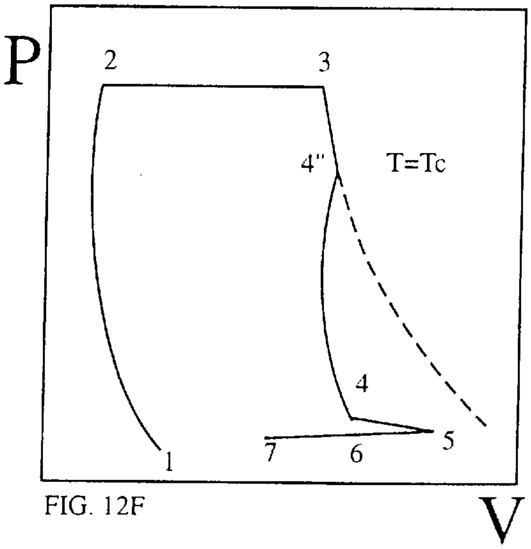

FIGS. 12E and 12F represent the thermodynamic processes during normal operation which is driven at relatively lower and decreasing temperatures which are generated by a leaner combustion mixture. Normal burner 100 is located relatively near the upstream portion of expander 20 and the heat generated by normal burner 100 is more available to the upstream portion of expander 20. With auxiliary burners off, only initial expansion in the upstream portion of heated expander 20 approximates isothermal expansion 3-4". With the leaner mixture and cooler combustion, the downstream portion of heated expander 20 operates with polytropic, rather than isothermal, expansion 4"-4.

Polytropic expansion has a lower temperature-entropy curve and a steeper pressure-versus-volume curve with reduced area under the TS and PV curves and less work per cycle.

FIGS. 12G and 12H show power regulation by control of fuel-air ratio and expansion temperature rather than operation of downstream burners. Power is increased by increasing the temperature within combustion chamber 24 which, in turn increases the temperature gain within regenerative heat exchanger 16. The growth of specific volume at constant pressure heating is proportional to the temperature gain. Thus the V term in the equation for the work of expansion is increased with an increase in the cycle work. The combustion chamber and combustion gas states are omitted here for simplicity.

Figure 13:
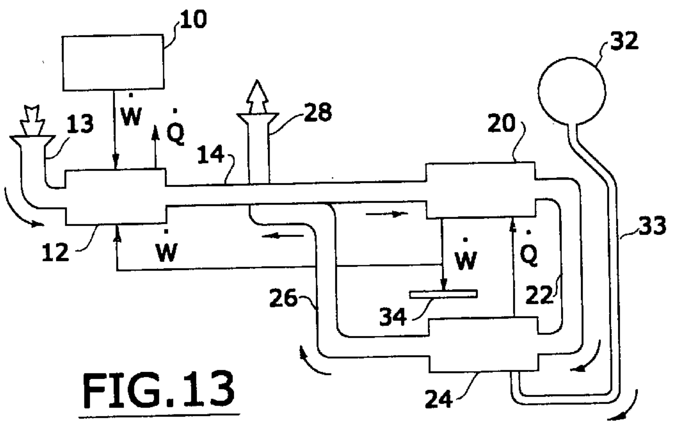
FIG. 13 shows a flow diagram of another embodiment of a quiet lawn mower power system

FIG. 13 shows an energy and fluid flow schematic of a quiet lawn mower power system. W and Q adjacent to the single width lines represent work, and heat transfer, respectively. During start-up a starter 10 drives a compressor 12. During normal operation, the expander drives both the compressor 12 and blades 34. During operation, air enters through a compressor inlet 13 into compressor 12 wherein it is compressed and driven through a compressor outlet air duct 14 in thermal contact with a portion combustion chamber gas outlet duct 26. Preheated compressed air flows into expander 20 wherein preheated compressed air is expanded. The expansion within expander 20 occurs while the air is further heated by heat from combustion chamber 24. Combustion chamber 24 is in intimate thermal contact with expander 20. The expansion of heated compressed air within expander 20 acts to generate power therein. This is the power needed to drive blades 34. Hot expanded air flows from expander 20 through an expander outlet air duct 22 into combustion chamber 24. Fuel from a fuel tank 32 flows through a fuel line 33 into combustion chamber 24 where combustion of the fuel is supported by hot expanded air flowing in through expander outlet air duct 22. Combustion is initiated, and if necessary sustained, by ignitors, not shown, which are internal to combustion chamber 24. After giving up heat to expander 20, the still hot combustion gasses from combustion chamber 24 through a combustion chamber gas outlet duct 26 in intimate heat transfer with a portion of compressor outlet duct 14. Heat is transferred from combustion gasses to the cooler compressed air from compressor 12 such that the compressed air is preheated as desired. The combustion gasses then flow through an exhaust vent 28 into the ambient.

Figure 14:
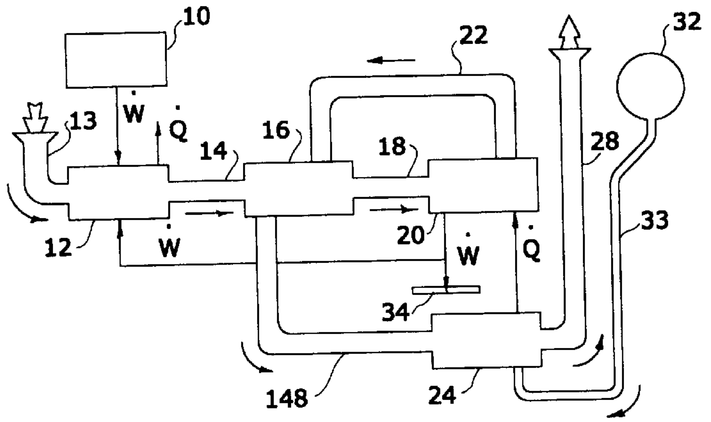
FIG. 14 shows a flow diagram of another embodiment of a quiet lawn mower power system

FIG. 14 is an energy and fluid flow schematic of another quiet lawn mower power system. During start-up a starter 10 drives compressor 12. During normal operation, Air enters through a compressor inlet 13 into compressor 12 wherein it is compressed and driven through a compressor outlet air duct 14 into a regenerative heat exchanger 16. Pre-heated compressed air flows through a regenerative heat exchanger outlet air duct 18 into expander 20 wherein preheated compressed air is expanded. The expansion within expander 20 occurs while the air is further heated by heat from combustion chamber 24. Combustion chamber 24 is in intimate thermal contact with expander 20. The expansion of heated compressed air within expander 20 acts to generate power therein to drive blades 34. Hot expanded air flows from expander 20 through an expander outlet air duct 22 into the warm side of regenerative heat exchanger 16. Fuel tank 32 supplies fuel which flows through a fuel line 33 into combustion chamber 24 where combustion of the fuel is supported by warm air flowing in through combustion chamber inlet air duct 148. Combustion is initiated and sustained by ignitors, not shown, which are internal to combustion chamber 24. After giving up heat to expander 20, combustion gasses from combustion chamber 24 flows through exhaust vent 28 into the ambient.

Figure 15:
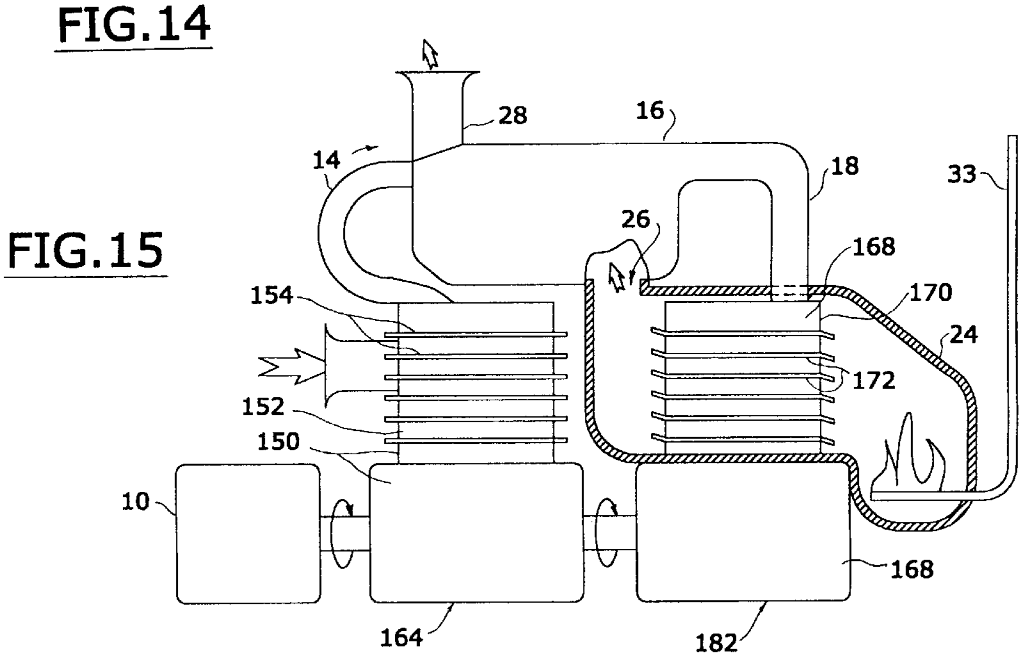
FIG. 15 shows one embodiment of a quiet external combustion engine driven lawn mower with reciprocating compressor and reciprocating heated expander.

FIG. 15 shows an embodiment of a quiet external combustion engine for a lawn mower with reciprocating compressor 150 and reciprocating heated expander 168. In addition, this embodiment consists of a starter 10, a compressor outlet air duct 14, a regenerative heat exchanger 16, a regenerative heat exchanger outlet duct 18, a combustion chamber 24, a combustion chamber gas outlet duct 26, and an exhaust vent 28. Cutter blade assembly 35 with blades 34 is driven by drive shaft 30, both not shown, which is driven by reciprocating expander 168. Reciprocating cooled compressor 150 comprises a compressor cylinder 152, compressor cylinder fins 154, compressor intake valve 156, compressor piston 158, compressor piston rod 160, compressor crank shaft 162, compressor crankcase 164 and one or more compressor outlet valves 166.

Similarly, reciprocating heated expander 168 comprises an expander cylinder 170, expander cylinder fins 172, expander intake valve 174, expander piston 176, expander piston rod 178, expander crank shaft 180, all not visible, expander crankcase 182 and one or more expander outlet valves 184, all not visible.

Compressor intake valve 156 opens as compressor piston 158 moves from top dead center toward bottom dead center and air flows into compressor cylinder 152 until compressor reaches bottom dead center and compressor intake valve 156 closes and compressor starts to move toward top dead center. When the air is sufficiently compressed, compressor outlet valve 166 opens to permit compressed air to flow through compressor outlet air duct 14 into cool side of regenerative heat exchanger 16. Preheated compressed air enters reciprocating expander 168 through open expander intake valve 174 while expander piston 176 is near top dead center and closes as expander piston moves away from top dead center. As the air expands it is heated by hot walls of expander cylinder which is being heated by hot combustion gasses of adjacent combustion chamber 24. When expander piston reaches bottom dead center, expander intake valve 174 closes and expander outlet valve 184 opens to permit flow of hot expanded air into adjacent combustion chamber 24. During start-up a starter 10 drives compressor 12. During normal operation, reciprocating expander 168 drives both the compressor 12 and blades 34. Preheated compressed air flows through a regenerative heat exchanger outlet air duct 18 into reciprocating expander 168 wherein preheated compressed air is expanded. Reciprocating heated expander 168 is in intimate heat transfer contact with combustion chamber 24. Expansion within expander 168 occurs while the air is reheated by heat from combustion chamber 24. Hot, expanded air flows from reciprocating expander 168 through an expander outlet air duct 22 into combustion chamber 24. Fuel from a fuel tank 32 flows through a fuel line 33 into combustion chamber 24 where combustion of the fuel is supported by hot expanded air flowing in through expander outlet air duct 22. Combustion is initiated and sustained, if necessary, by ignitors, not shown, which are internal to combustion chamber 24. After giving up heat to reciprocating expander 1680, the still hot combustion gasses from combustion chamber 24 through a combustion chamber gas outlet duct 26 into the hot side of regenerative heat exchanger 16. Therein heat is transferred from combustion gasses to the cooler compressed air from reciprocating compressor 150 such that air is preheated as desired. The combustion gasses then flow from regenerative heat exchanger 16 through an exhaust vent 28 into the ambient.

As a result, combustion is efficiently supported and power is efficiently generated to quietly drive a lawn mower. All elements between piston rod 178 and blades 34 are conventional. The lawn mower is similar to conventional lawn mowers except for the lawn mower engine which is a quiet external combustion engine.

SOME PERFORMANCE CONSIDERATIONS

With a conventional combustion fired Ericsson cycle, the heat generated per cycle can be estimated by:

$$h = NHV/AF$$

where NHV and AF are the net heating value of the fuel and air-fuel ratio, respectively. Assume reasonable values of 16,000 Btu/lb(37,200 kJ/kg) of fuel and with 50% excess air, 22.5 lbs air/lb of fuel.

h=(16,000 Btu/lb fuel)/((22.5+1/22.5) lbs/lb fuel) with 50% excess air.

16,000/22.54=709.7 Btu/lb (1,651 kJ/kg)

products Total heat=Initial heat+gained in combustion. At standard conditions for air, h=128.34 Btu/lb Combustion h=128.3 Btu/lb+709.7 Btu/lb=838 Btu/lb With the improvement of the present invention, the expander exhaust outlet temperature would be approximately 1520 oR (833 oK). The heat content of the air entering combustion chamber 24 would be approximately 374.5 Btu/lb Combustion h=374.5+709.7=1084.2 Btu/lb.

This 29% gain in combustion gas heat within combustion chamber 24 is generated at no additional expenditure of fuel.

Although the description above contains many specifications, these should not be construed as limiting the scope of the invention but as merely providing illustrations of some of presently preferred embodiments of this invention. Thus, the scope of this invention should be determined by the appended claims and their functional equivalents, rather than by the examples given.

I claim:

1. A quiet external combustion engine powered lawn mower having a starter means, an engine operatively connected to said starter means, an engine mounting means for mounting said engine to a mower housing, a fuel storage means mounted on said mower housing, fuel supply piping means mounted on said mower housing, a lawn mower locomotion means, a cutting blade assembly positioned under said mower housing and including a drive shaft connected to said cutting blade assembly for transmitting rotary power from said engine to said cutter blade assembly, the improvement comprising;

said engine comprising a compressor, first clutching means, a heated expander, a combustion chamber, a first ducting means, a second ducting means, a first expander driven drive means, a second expander driven drive means, a fuel injection means, an ignition means, and an exhaust duct, wherein said first clutching means connects said starter means with said compressor of said engine, said heated expander being mechanically connected to said drive shaft of said cutting blade assembly and to said compressor which is fluid flow connected to air inlet of said heated expander through said first ducting means, said heated expander is fluid flow connected to said combustion chamber through said second ducting means, said combustion being downstream of said heated expander, said heated expander being mechanically connected by said first expander driven drive means to said compressor and by said second expander driven drive means to said drive shaft of said cutting blade assembly, said combustion chamber being in intimate heat transfer contact with said heated expander, said fuel storage means being fluid flow connected to interior of said combustion chamber by said fuel supply piping means, said fuel supply piping means connects directly into said fuel injection means proximate to said ignition means, said exhaust duct being positioned downstream of said heated expander which is positioned in path of gasses from combustion chamber wherein during mower start up said first clutching means opens to disconnect said starter means from said compressor of said engine, wherein during mower operation, said heated expander being mechanically connected to said drive shaft of said cutting blade assembly through a second clutching means operatively connecting said drive shaft with said second expander driven drive means and said heated expander being mechanically connected to said compressor through said first expander driven drive means when said compressor is driven by said heated expander faster than by said starter means whereby said lawn mower is silently powered by said external combustion engine as desired.

2. An external combustion engine powered lawn mower as claimed in claim 1, further including a regenerative heat exchanger having a cold side and a hot side and a third ducting means, and said cold side of said regenerative heat exchanger is downstream of said compressor and upstream of said third ducting means and said heated expander and so that said hot side of said regenerative heat exchanger is downstream of said combustion chamber and upstream of said exhaust duct, said heated expander being placed in intimate heat transfer contact with said combustion chamber and directly in a flow path of hot gasses flowing toward said regenerative heat exchanger.

3. An external combustion engine powered lawn mower, as claimed in claim 2 comprising, in addition, insulation around exterior of said combustion chamber whereby heat generated within said combustion chamber is conserved and said heated expander is more efficiently heated.

4. An external combustion engine powered lawn mower as claimed in claim 2 wherein said compressor is a reciprocating positive displacement compressor.

5. An external combustion engine powered lawn mower as claimed in claim 2 wherein said compressor is a rotary compressor.

6. An external combustion engine powered lawn mower as claimed in claim 2 wherein said heated expander is a reciprocating positive displacement expander.

7. An external combustion engine powered lawn mower as claimed in claim 2 wherein said heated expander is a rotary expander.

8. An external combustion engine powered lawn mower as claimed in claim 7 wherein rotor of said rotary expander is a hollow rotor.

9. A quiet external combustion engine powered lawn mower having a starter means, an engine operatively connected to said starter means, an engine mounting means for mounting said engine to a mower housing, a fuel storage means mounted on said mower housing, fuel supply piping means mounted on said mower housing, a lawn mower locomotion means, a cutting blade assembly positioned under said mower housing and a drive shaft connected to said cutting blade assembly for transmitting rotary power from said engine to said cutter blade assembly, the improvement comprising;

said engine comprising a compressor, first clutching means, a heated expander, a combustion chamber, said combustion chamber enclosing said heated expander, a first ducting means, a second ducting means, a first expander driven drive means, a second expander driven drive means, a fuel injection means, an ignition means, and an exhaust duct, wherein said first clutching means connects said starter means with said compressor of said engine, said heated expander being mechanically connected to said drive shaft of said cutting blade assembly and to said compressor which is fluid flow connected to air inlet of said heated expander through said first ducting means, said heated expander is fluid flow connected to said combustion chamber through said second ducting means, said combustion chamber being downstream of said heated expander, said heated expander being mechanically connected by said first expander driven drive means to said compressor and by said second expander driven drive means to said drive shaft of said cutting blade assembly, said fuel storage means being fluid flow connected to interior of said combustion chamber by said fuel supply piping means, said fuel supply means connects directly into said fuel injection means proximate to said ignition means, said exhaust duct being positioned downstream of said heated expander, wherein during start up said first clutching means opens to disconnect said starter means from said compressor of said engine, wherein during mower operation, said heated expander being mechanically connected to said drive shaft of said cutting blade assembly through a second clutching means operatively connecting said drive shaft with said second expander driven drive means and said heated expander being mechanically connected to said compressor through said first expander driven drive means when said compressor is driven by said heated expander faster than by said starter means whereby said lawn mower is silently powered by said external combustion engine as desired.

10. An external combustion engine powered lawn mower as claimed in claim 9, further including a regenerative heat exchanger having a cold side and a hot side and a third ducting means, and said cold side of said regenerative heat exchanger is downstream of said compressor and upstream of said third ducting means and said heated expander and so that said hot side of said regenerative heat exchanger is downstream of said combustion chamber and upstream of said exhaust duct, said heated expander being enclosed within said combustion chamber and directly in a flow path of hot gasses flowing toward said regenerative heat exchanger.

* * * * *